United States Patent [19]

Sunami

[11] Patent Number: 4,983,950
[45] Date of Patent: Jan. 8, 1991

[54] CAR THEFT PROOFING SYSTEM

[76] Inventor: Sadakatsu Sunami, 8-3, Asukanokita 3-chome, Ikoma-shi, Nara-ken, Japan

[21] Appl. No.: 240,670

[22] Filed: Sep. 6, 1988

[30] Foreign Application Priority Data

| Jun. 21, 1988 | [JP] | Japan | 63-153781 |
| Jun. 21, 1988 | [JP] | Japan | 63-153782 |
| Jul. 11, 1988 | [JP] | Japan | 63-172382 |
| Jul. 11, 1988 | [JP] | Japan | 63-172383 |

[51] Int. Cl.⁵ .................................................. B60R 25/10
[52] U.S. Cl. ................................. 340/426; 340/539; 340/542; 307/10.2; 200/61.64; 70/416; 70/DIG. 49; 70/DIG. 51; 180/173; 180/287
[58] Field of Search ............................ 340/63-65, 340/539, 541, 542, 825.31, 825.32, 426; 307/10 AT, 10 R, 9.1, 10.1, 10.2, 10.3; 180/173, 287; 200/61.64; 70/416-419, 379 R, 357, DIG. 2, 21, 38, DIG. 49, 51

[56] References Cited

U.S. PATENT DOCUMENTS

| 2,921,299 | 1/1960 | Zimmerman | 340/63 |
| 3,733,862 | 5/1973 | Killmeyer | 340/542 |
| 3,797,004 | 3/1974 | Muessel et al. | 70/DIG. 49 |
| 3,936,673 | 2/1976 | Kelly et al. | 307/10 At |
| 3,967,481 | 7/1976 | Schlage | 70/419 |
| 4,035,791 | 7/1977 | Katayama | 307/10 AT |
| 4,148,202 | 4/1979 | Wegrzyx | 70/DIG. 49 |
| 4,225,008 | 9/1980 | Colell et al. | 340/63 |
| 4,628,300 | 12/1986 | Amato | 340/63 |
| 4,635,035 | 1/1987 | Ratzabi | 340/542 |
| 4,656,851 | 4/1987 | Leek et al. | 70/DIG. 49 |
| 4,768,027 | 8/1988 | Benjamin et al. | 340/63 |
| 4,803,467 | 2/1989 | Peters | 340/542 |

Primary Examiner—Donnie L. Crosland
Attorney, Agent, or Firm—Edwin E. Greigg

[57] ABSTRACT

A car theft proofing system includes a sensor attached to or mounted adjacent a cylinder door lock for detecting insertion into the door lock of a door key or other article, an alarm device for giving an alarm, an alarm drive device for driving the alarm device, and a control unit for causing the alarm device to give the alarm in response to signals received from the sensor and the alarm drive device.

7 Claims, 6 Drawing Sheets

CAR THEFT PROOFING SYSTEM

BACKGROUND OF THE INVENTION

(1) Field of the Invention

The present invention relates to car theft proofing systems, and more particularly to a car theft proofing system acting as a safeguard against car theft in which a thief unlocks a car door by inserting a plate, bar or other articles through a space between a window pane and a door panel into a door lock mechanism, or by inserting an imitation key, wire or other articles into a cylinder door lock.

(2) Description of the Prior Art

Conventionally, when leaving a car, the car owner (driver) shuts the windows and locks the door with a door key to avoid theft.

The car door has a vertically movable window pane, and a space is formed between the window pane and the door panel. This space is sealed against rain by means of moquette, rubber seal or the like.

Recently the doors of parked cars are often forced open and equipment such as car stereos and air-conditioners are stolen by thieves. In such cases, a door is unlocked by pushing and flexing the window pane inwardly or deforming the rubber seal and pressing the window pane for access to the space between the window pane and the door panel. Through this space the thief inserts a thin plate, bar or other picklock instrument, and directly manipulates a door lock mechanism. Car theft cases are taking place in an increasing number wherein not only the interior equipment but cars themselves are stolen and used in secondary, atrocious crimes such as robbery and kidnaping, or to cause traffic accidents.

On the other hand, thieves often unlock the doors of parked cars by inserting a wire, imitation key or other article into the cylinder door lock, and steal the interior equipment or the cars themselves for use in atrocious crimes.

SUMMARY OF THE INVENTION

Having regard to the problem in safeguarding cars against theft, the object of the present invention is to provide a car theft proofing system which gives an alarm before a thief forces open a door thereby to effectively prevent car theft.

In order to achieve the above object, a car theft proofing system according to a first aspect of the present invention comprises a sensor attached to a cylinder door lock for detecting insertion into the door lock of a door key or other article, an alarm device for giving an alarm, alarm drive means to output a signal for driving the alarm device, and control means to cause the alarm device to give the alarm in response to a signal received from the sensor and the signal from the alarm drive mean.

According to the present invention, when the car owner leaves the car, he or she sets the alarm device to be operable by the sensor and the alarm drive means. When in this state a thief inserts a picklock instrument into the cylinder door lock, the sensor is turned on. As a result, the control means causes the alarm device to give an alarm in response to the on-state of the sensor and the alarm drive means.

On the other hand, the car owner or authorized person may cancel the operable state of the alarm device by means of the sensor and/or the alarm drive means before opening the car door. Consequently, the alarm will not sound with insertion into the cylinder lock of a door key or other article.

As will be understood from the above, the present invention provides a sensor for detecting insertion into the cylinder door lock of a door key or other article, and alarm drive means to output a signal for driving the alarm device. When a thief attempts to open the door with an imitation key or the like, the sensor and the alarm drive means in the on-state cause the alarm device to give an alarm. Thus, the invention effectively protects the car and the stereo or other interior equipment from theft. When the car owner or authorized person intends to open the door, he or she may cancel the operation of the alarm device in advance with the alarm drive means, thereby to eliminate possibility of sounding of the alarm.

The foregoing object may also be achieved, according to a second aspect of the present invention, by a car theft proofing system comprising a sensor attached to a door lock mechanism for detecting insertion into the door lock mechanism of a plate, bar or other article, an alarm device for giving an alarm, alarm drive means to output a signal for driving the alarm device, and control means to cause the alarm device to give the alarm in response to a signal received from the sensor and the signal from the alarm drive means.

According to the second aspect of the invention, when the car owner leaves the car, he or she sets the alarm device to be operable by the sensor and the alarm drive means. When in this state a thief inserts a thin plate into a space between the window pane and the door panel, the sensor detects the thin plate and is turned on. As a result, the control means causes the alarm device to give an alarm in response to signals from the sensor and the alarm drive means.

On the other hand, the car owner or authorized person may cancel the operable state of the alarm device by means of the sensor and/or the alarm drive means before opening the car door. Consequently, the alarm will not sound with insertion of a thin plate into the space between the window pane and the door panel for undoing the door lock mechanism.

As will be understood from the above, the second aspect of the invention provides a sensor attached to a door lock mechanism for detecting insertion into the door lock mechanism of a plate, bar or other article, and alarm drive means to output a signal for driving the alarm device. When both the sensor and the alarm drive means give output signals, the alarm device is caused to give an alarm in response to these signals. Thus, an alarm will sound when a thief attempts to open the door with a thin plate or the like, thereby to effectively protect the car and the stereo or other interior equipment from theft.

According to a third aspect of the present invention, a car theft proofing system comprises a first sensor attached to a door lock mechanism for detecting insertion into the door lock mechanism of a plate, bar or other article, a second sensor attached to a cylinder door lock for detecting insertion into the door lock of a door key or other article, an alarm device for giving an alarm, alarm drive means to output a signal for driving the alarm device, and control means to cause the alarm device to give the alarm in response to a signal received from at least one of the first and second sensors and the signal from the alarm drive means.

When the car owner leaves the car, he or she sets the alarm device to be operable by the alarm drive means. When in this state a thief inserts an imitation key or other article into the cylinder door lock or a thin plate into a space between the window pane and the door pane, the first or second sensor is turned on. As a result, the control means causes the alarm device to give an alarm in response to the on-state of the alarm drive means and one of the sensors.

On the other hand, the car owner or authorized person may cancel the operable state of the sensors and/or the alarm drive means before opening the car door. Consequently, the alarm will not sound with insertion into the cylinder lock of a door key.

Thus, according to the third aspect of the invention, there are provided a first sensor for detecting insertion into the door lock mechanism of a plate, bar or other article, a second sensor for detecting insertion into the cylinder door lock of a door key or other article, and alarm drive means to output a signal for driving the alarm device. An alarm is sounded when, with the sensors and the alarm drive means in the on-state, a thief attempts to open the door by inserting a thin plate through the window or by inserting an imitation key or the like into the cylinder lock. Thus, the system according to the third aspect of the invention effectively protects the car and the air-conditioner or other interior equipment from theft. When the car owner or authorized person intends to open the door, he or she may turn off the alarm drive means and/or sensors to render the alarm device inoperable in advance. Then the alarm will not sound as a result of the insertion of the door key into the cylinder lock.

According to a fourth aspect of the present invention, a car theft proofing system comprising a band sensor mounted in a space between a car door and a window pane and upwardly of a door lock mechanism for detecting insertion into the space of a plate, bar or other article, an alarm device for giving an alarm, alarm drive means to output a signal for driving the alarm device, and control means to cause the alarm device to give the alarm in response to a signal received from the band sensor and the signal from the alarm drive means.

When the car owner leaves the car, he or she sets the alarm device to be operable by the alarm drive means. When in this state a thief inserts a thin plate into the space between the window pane and the door panel, the sensor detects the thin plate and is turned on. As a result, the control means causes the alarm device to give an alarm in response to signals from the sensor and the alarm drive means.

The sensor is mounted in the space between the door panel and the window pane and upwardly of the door lock mechanism, namely adjacent a position of entry of a picklock instrument. Accordingly, the sensor detects the picklock instrument before it reaches the door lock mechanism, which is effective to prevent car theft with increased reliability.

On the other hand, the car owner or authorized person may cancel the operable state of the alarm device by means of the alarm drive means and/or the sensor before opening the car door. Consequently, in an emergency when the owner or authorized person does not have the car key in hand, the alarm will not sound with insertion of a thin plate into the space between the window pane and the door panel for undoing the door lock mechanism.

Thus, according to the second aspect of the invention, when leaving the car, the car owner (driver) sets the alarm device to be operable by the alarm drive means. When in this state a thief inserts a thin plate through the space between the window pane and the door panel, the sensor detects the thin plate and is turned on. As a result, the control means causes the alarm device to give an alarm in response to the signals from the sensor and the alarm drive means.

The sensor is mounted in the space between the door panel and the window pane and upwardly of the door lock mechanism, namely adjacent a position of entry of a picklock instrument. Accordingly, the sensor detects the picklock instrument before it reaches the door lock mechanism, which is effective to prevent car theft with increased reliability. Thus the fourth aspect of the invention is capable of avoiding use of stolen cars in atrocious crimes.

On the other hand, the car owner or authorized person may cancel the operable state of the alarm device by means of the alarm drive means and/or the sensor before opening the car door. Consequently, in an emergency when the owner or authorized person does not have the car key in hand, the alarm will not sound with insertion of a thin plate into the space between the window pane and the door panel for undoing the door lock mechanism.

According to a fifth aspect of the present invention, a car theft proofing system comprising a band sensor mounted in a space between a car door and a window pane and upwardly of a door lock mechanism for detecting insertion into the space of a plate, bar or other article, a sensor attached to or mounted adjacent a cylinder door lock for detecting insertion into the door lock of a door key or other article, an alarm device for giving an alarm, alarm drive means to output a signal for driving the alarm device, and control means to cause the alarm device to give the alarm in response to a signal received from at least one of the sensors and the signal from the alarm drive means.

When the car owner leaves the car, he or she sets the alarm device to be operable by the alarm drive means. When in this state a thief inserts an imitation key or other article into the cylinder door lock or a thin plate into the space between the window pane and the door pane, the band sensor mounted in the space between the window pane and the door pane or the sensor attached to or mounted adjacent the cylinder lock is turned on. As a result, the control means causes the alarm device to give an alarm in response to output signals of the alarm drive means and one of the sensors.

On the other hand, the car owner or authorized person may cancel the operable state of the sensors and/or the alarm drive means before opening the car door. Consequently, the alarm will not sound with insertion into the cylinder lock of a door key or the like.

Thus, according to the fifth aspect of the invention, when leaving the car, the car owner (driver) sets the alarm device to be operable by the alarm drive means. When in this state a thief inserts an imitation key or other article into the cylinder lock or a thin plate through the space between the window pane and the door panel, the band sensor mounted in the space between the window pane and the door panel or the sensor attached to or mounted adjacent the cylinder lock is turned on. As a result, the control means causes the alarm device to give an alarm in response to the signals from the alarm drive means and one of the sensors.

In this example, the band sensor is mounted in the space between the window pane and the door panel, and the other sensor is attached to or mounted adjacent the cylinder lock. Therefore, an alarm will be given when a thief inserts an imitation key or other article into the cylinder lock or a thin plate through the space between the window pane and the door panel, whereby car theft is prevented with increased reliability.

On the other hand, the car owner or authorized person may cancel the operable state of the alarm device by operating the alarm drive means and/or the sensor before opening the car door. Consequently, the alarm will not sound with insertion of the door key or other article into the cylinder lock.

According to a sixth aspect of the present invention, a car theft proofing system comprising a sensor mounted adjacent a cylinder door lock for detecting insertion into the door lock of a door key or other article, an alarm device for giving an alarm, alarm drive means to output a signal for driving the alarm device, and control means to cause the alarm device to give the alarm in response to a signal received from the sensor and the signal from the alarm drive means.

When the car owner leaves the car, he or she sets the alarm device to be operable by the sensor and the alarm drive means. When in this state a thief inserts a picklock instrument into the cylinder door lock, the sensor is turned on. As a result, the control means causes the alarm device to give an alarm in response to the on-state of the sensor and the alarm drive means.

On the other hand, the car owner or authorized person may cancel the operable state of the alarm device by means of the sensor and/or the alarm drive means before opening the car door. Consequently, the alarm will not sound with insertion into the cylinder lock of a door key or other article.

In this example, the sensor is not mounted inside the cylinder lock but is mounted adjacent, i.e. outwardly of the cylinder lock. This construction allows the sensor to be attached easily and reliably.

As will be understood from the above, the sixth aspect of the invention provides a sensor mounted adjacent, i.e. outwardly of the cylinder lock for detecting insertion into the cylinder door lock of a door key or other article. The alarm device is operable to give an alarm when the sensor and the alarm drive means are turned on. Therefore, when a thief attempts to open the door with an imitation key or the like, the alarm device will give an alarm thereby to effectively protect the car and the stereo or other interior equipment from theft. Since the alarm is given before the car door is opened, car theft is prevented positively. When the car owner or authorized person intends to open the door, he or she may cancel the operation of the alarm device in advance with the alarm drive means, thereby to eliminate possibility of sounding of the alarm.

The sensor which is not mounted inside the cylinder lock but adjacent, i.e. outwardly of the cylinder lock may be attached easily and reliably.

Further, in the sixth aspect of the invention, the cylinder door lock may define a through bore extending from one peripheral position to an opposite peripheral position through a keyhole. In this case, the sensor includes an output element disposed outwardly of said one peripheral position for providing an output signal and a sensing element disposed outwardly of said opposite peripheral position for detecting the output signal. This construction allows the sensor to be attached with ease and to detect a picklock instrument inserted adjacent the cylinder lock as well.

Alternatively, the cylinder door lock may define a bore extending from one peripheral position to a keyhole. In this case, the sensor is disposed outwardly of the bore and includes an output element for providing an output signal and a sensing element for detecting the output signal as reflected by the door key or other article inserted into the door lock. This construction allows the sensor to be attached with even greater ease and to detect a picklock instrument inserted adjacent the cylinder lock as well.

In the above example, the sensing element may comprise the type that detects disturbances of the output signal as reflected. Such a sensing element is capable of readily distinguishing between the signal reflected by an inside wall of the cylinder lock and the signal reflected by the door key or other article, and therefore is free from operational errors.

Other advantages of the present invention will be apparent from the following description to be had with reference to the drawings.

BRIEF DESCRIPTION OF THE DRAWINGS

The drawings illustrate car theft proofing systems according to the present invention, in which.

DETAILED DESCRIPTION OF THE PREFERRED EMBODIMENTS

Embodiments of the present invention will particularly be described hereinafter, but the invention is not limited to such embodiments.

Figure 1:
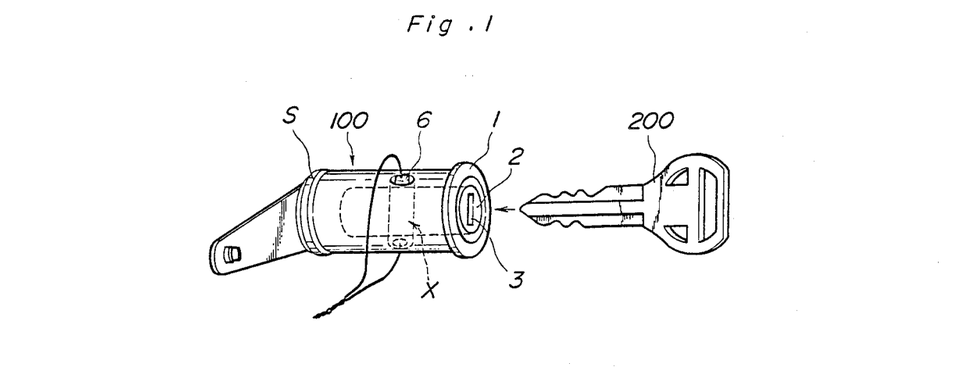
FIG. 1 is a perspective view of a cylinder lock for a car door.
Figure 2:
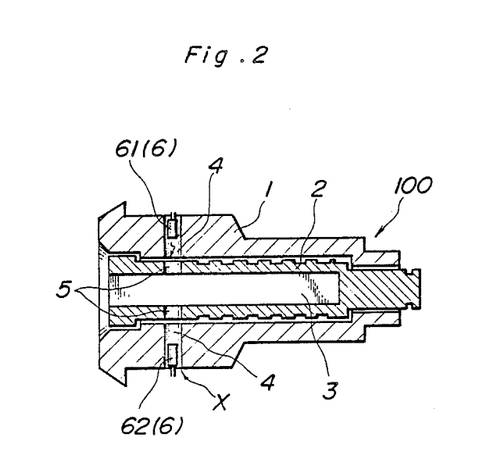
FIG. 2 is a sectional view of the cylinder lock.

FIG. 1 is a perspective view of a cylinder door lock of a car theft proofing system according to one embodiment of the present invention. FIG. 2 is a schematic sectional view of the cylinder door lock.

In FIGS. 1 and 2, the cylinder door lock 100 comprises a hollow outer cylinder 1 and an inner cylinder 2 rotatably mounted in the outer cylinder 1. The inner cylinder 2 has a keyhole 3 for removably receiving a door key 200.

The outer cylinder 1 includes bores 4, and the inner cylinder 2 includes bores 5. These bores 4 and 5 communicate with one another to define a through bore X when the door key 200 is removed from the inner cylinder 2.

More particularly, the inner cylinder 2 is constantly maintained in a predetermined position relative to the outer cylinder 1 under the urging force of a spring S unless the inner cylinder 2 is rotated by the door key 200. When the inner cylinder 2 is in the predetermined position, the bores 4 and 5 are aligned to define the through bore X.

The bores 4 of the outer cylinder 1 accommodate a sensor 6 for detecting insertion into the door lock 100 of the door key 200 or other articles. This sensor 6 will be described in detail hereinafter.

Figure 3:
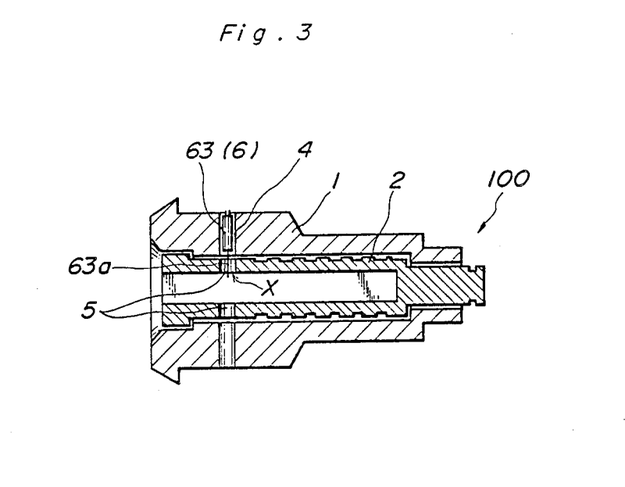
FIG. 3 is a sectional view of a modified cylinder lock.

The sensor 6 comprises, for example, a photosensor including a light emitting element and a light receiving element, a limit switch operable upon contact with the door key 200 or other articles, or a proximity switch.

Where the sensor 6 comprises a photosensor, the photosensor 6 includes a light emitting diode 61 and a phototransistor 62. The light emitting diode 61 is mounted in one of the bores 4 defined in the outer cylinder 1, and the phototransistor 62 in the other bore 4. Consequently, when the through bore X is formed, light emitted from the diode 61 passes through the through bore X and enters the phototransistor 62.

Where the sensor 6 comprises a limit switch, the switch 63, as shown in FIG. 3, is mounted in one of the bores 4 of the outer cylinder 1 with a contact 63a thereof extending into one of the bores 5 of the inner cylinder 2. The contact 63a is contactable by the door key 200 or other article inserted through the keyhole 3, whereby the sensor 6 is turned on to provide an output signal.

Figure 4:
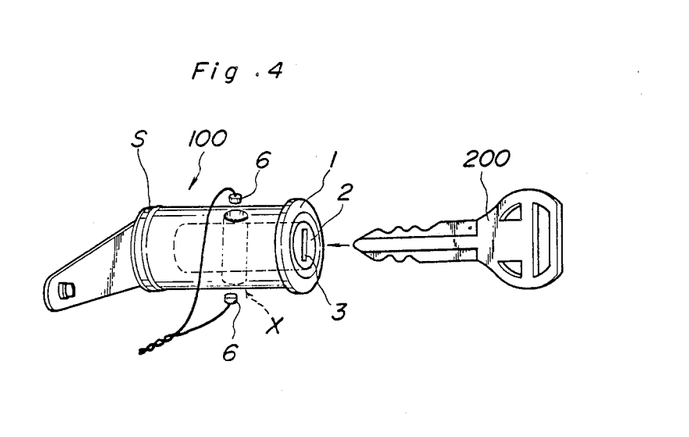
FIG. 4 is a perspective view of a cylinder lock with a sensor mounted adjacent thereto.
Figure 5:
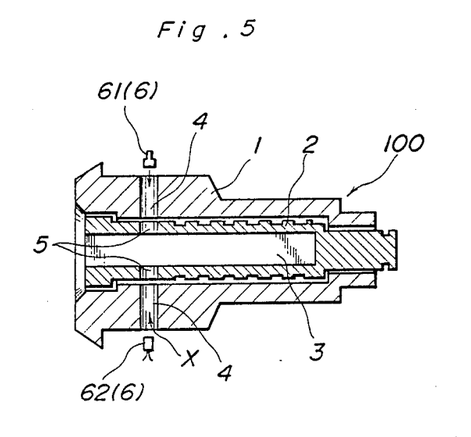
FIG. 5 is a sectional view of the cylinder lock of FIG. 4.
Figure 6:
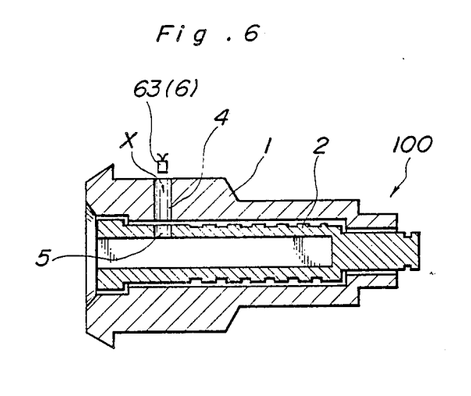
FIG. 6 is a sectional view of a further example of cylinder lock.

In the foregoing examples, the sensor 6 is mounted in the cylinder door lock 100. Alternatively, the sensor 6 may be mounted adjacent the door lock 100 as shown in FIGS. 4 through 6. Thus the sensor 6 is mounted adjacent or outwardly of the outer cylinder 1 for detecting insertion into the door lock 100 of the door key 200 or other article. This sensor 6 will particularly be described now.

The sensor 6 comprises a photosensor including a light emitting element and a light receiving element in this example, but may comprise a transmitter-receiver combination of ultrasonic or radio waves, for example.

Where the sensor 6 comprises a photosensor, the sensor includes a light emitting diode 61 and a phototransistor 62. As shown in FIGS. 4 and 5, the light emitting diode 61 is mounted outwardly of one end of the through bore X, and the phototransistor 62 outwardly of the other end thereof for sensing the output signal of the light emitting diode 61. Consequently, when the through bore X is formed, light emitted from the diode 61 passes through the through bore X and enters the phototransistor 62.

FIG. 6 shows another construction wherein the door lock 100 defines a bore X1 extending from a peripheral position into communication with the keyhole 3, and a sensor 6 (63) is mounted outwardly of the bore X1. The sensor 6 (63) includes an output element (not shown) for emitting an output signal into the bore X1, and a sensing element (not shown) for detecting the output signal reflected by the door key 200 or other article inserted into the door lock 100. When the door key 200 or other article is inserted through the keyhole 3, the output signal from the output element is reflected by the door key 200 or other article, and the reflected signal is detected by the sensing element whereby the sensor 6 (63) is turned on to provide a signal. Preferably, the sensing element comprises the type that detects disturbances of the reflected signal, so that the signal reflected by the door key 200 or other article may readily be distinguished from the signal reflected by an inside wall of the door lock 100 to eliminate possibility of operational error.

The sensor 6 employed in this example is not limited to a particular type as long as disturbances of the output signal reflected by the door key 200 or other article are detected. For example, the sensor 6 may comprise a light, ultrasonic or radio wave emitting element (output element), and a sensing element for detecting disturbances of the light, ultrasonic or radio waves.

Figure 7:
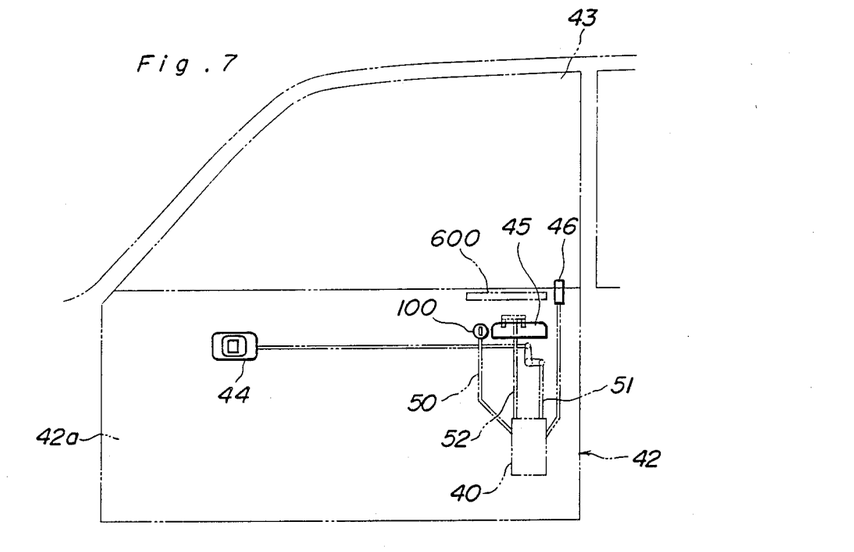
FIG. 7 is a schematic view of a car door having a theft proofing system according to the present invention.

FIG. 7 is a schematic view of an embodiment of the present invention in which a car door 42 includes a band sensor 600 mounted in a space between a window pane 43 and a door panel 42a and upwardly of a door lock mechanism 40 for detecting a wire, bar or other such article inserted into that space. FIG. 7 shows the door lock mechanism 40 and associated elements.

In FIG. 7, the door lock mechanism 40 is mounted at a lower inside position of the car door 42, and the band sensor 600 is mounted in the space between the window pane 43 and the door panel 42a upwardly of the door lock mechanism 40.

The cylinder lock 100 is mounted above the door lock mechanism 40 and is exposed outwardly. Number 44 indicates an inside door knob, number 45 an outside door knob, and number 46 a window-side lock knob.

The band sensor 600 is mounted upwardly of the door lock mechanism 40 as noted above. More specifically, the band sensor 600 is provided at a position of entry or passage, and an area surrounding such a position, of a thin plate 59 or the like used by a thief for manipulating the door lock mechanism 40 in an attempt to unlock the door.

The band sensor 600 may comprise an image sensor or a line sensor. The line sensor is preferred since it is inexpensive and can be mounted in a narrow space. The line sensor may comprise a CTD such as a CCD or a BBD.

Further, the band sensor 600 may comprise a photosensor including a light emitting element and a light receiving element, an ultrasonic or radio wave emitter-receiver combination, a combination of a light, ultrasonic or radio wave emitter and a sensing element for detecting disturbances of the light, ultrasonic or radio waves, or a pressure sensitive element in band form.

In other words, the band sensor 600 employed in the present invention may comprise a sensor including a ceramic oscillator utilizing ultrasonic wave or a composite oscillator, a proximity sensor utilizing magnetism, a pressure sensitive switch, or a radio wave sensor. These sensors and switches may be the transmission type or the reflection type, and may be formed of a single element or a plurality of elements arranged at selected intervals.

Figure 8:
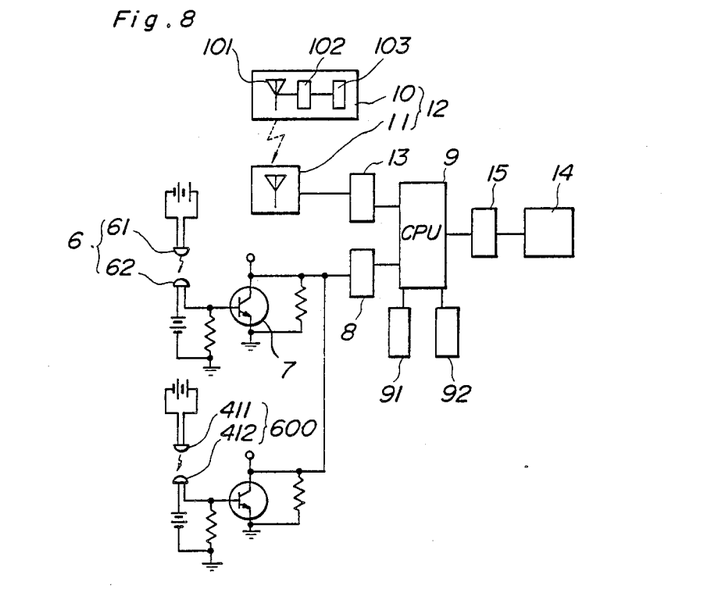
FIG. 8 is a block diagram of the theft proofing system.

FIG. 8 is a block diagram of a car theft proofing system according to the present invention.

The phototransistor 62 of the sensor 6 is connected to the base of another transistor 7 which gives an output through an I/O interface 8 to the CPU of a computer which is one example of control unit 9. The band sensor 600 has a phototransistor 412 which likewise is connected through the I/O interface 8 to the CPU 9.

An alarm drive device 12 acts as means to provide a signal for driving an alarm 14 to be described later and, as shown in FIG. 8, includes a remote control transmitter 10 and a receiver 11. The remote control transmitter 10 transmits radio waves with a frequency allotted to each car. This frequency may be shared to a certain extent by other cars as long as there is no possibility of interference (for example, interference may be avoided by regional allotment). The transmitter 10 includes an antenna 101, a transmitting unit 102, and a control unit 103 for controlling them.

The receiver 11 acts as means to receive the radio waves transmitted from the remote control transmitter 10, and is installed on the car. The receiver 11 is connected through an I/O interface 13 to the CPU 9.

The alarm drive device 12 need not necessarily comprise the radio wave transmitting remote control type but may be the light emitting remote control type. Alternatively, the alarm drive device 12 may be directly plugged into a connector provided on a car body, for example, to transmit a drive signal to the computer.

In this case, the drive signal may be prevented from being generated when the car owner or other authorized person plugs the alarm drive device 12 into the connector a second time. Further, the drive signal may be transmitted to and stored in the computer by plugging the alarm drive device 12 into the connector provided on the car body, the alarm being turned off by remote control for the owner or other authorized person to open the door.

The alarm 14 may comprise a buzzer for producing an extraordinary warning sound, a car horn, a signal lamp for emitting red light, or their combination. The alarm 14 is connected through an I/O interface 15 to the CPU 9.

A ROM 91 and a RAM 92 are connected to the CPU 9. The ROM 91 stores a program for causing the CPU 9 to output an alarm signal to the alarm 14 in response to the signals transmitted from the receiver 11 and the sensor 6. The RAM 92 is used for reading and writing data for the operation of CPU 9.

Figure 9:
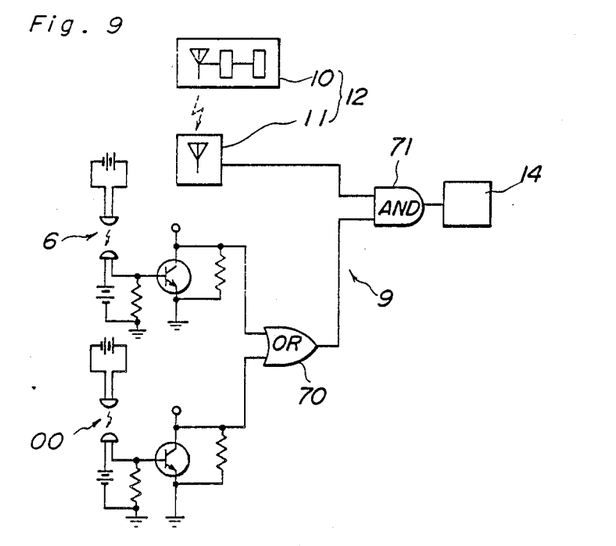
FIG. 9 is a block diagram of a modified car theft proofing system.

FIG. 9 is a block diagram of another embodiment of the present invention.

In FIG. 9, the control unit 9 includes an OR circuit 70 and an AND circuit 71 of logic elements. The OR circuit 70 receives the outputs of the photosensor 6 and the photosensor (band sensor) 600. The AND circuit 71 receives the output of the receiver 11 and an output signal of the OR circuit 70, and in response to these signals outputs a drive signal to the alarm 14.

Figure 10:
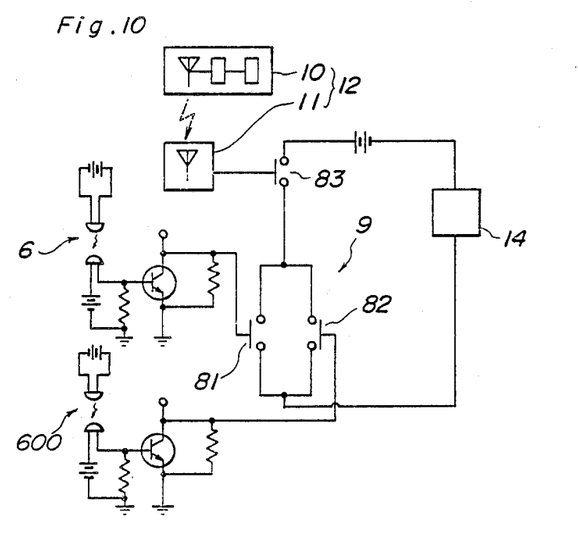
FIG. 10 is a block diagram of another car theft proofing system according to the present invention.

FIG. 10 is a block diagram of a futher embodiment of the present invention.

In FIG. 10, the control unit 9 includes a first switch 81 and a second switch 82 in parallel connection, and a third switch 83 connected in series thereto. The first switch 81 is connected to the sensor 6, the second switch 82 to the band sensor 600, and the third switch 83 to the receiver 11. In this case too, the control unit 9 receives the signals from the sensor 6, band sensor 600 and receiver 11, and outputs a drive signal to the alarm 14 only when at least one of the sensors 6 and 600 is turned on and the receiver 11 transmits the signal.

An operation of the foregoing embodiments where the sensor 6 comprises a photosensor will particularly be described next.

When the car owner leaves the car, he or she shuts the window, locks the door, and operates the remote control transmitter 10 to transmit the signal. This signal is received by the receiver 11 and input to the CPU (control unit) 9.

A thief approaches the car in this state, and attempts to open the car door by inserting a thin plate, bar, imitation key or the like into the cylinder door lock 100. When the door lock 100 is turned by the article inserted thereto, the through bore X is broken and the light from the sensor 6 is interrupted or the reflected signal from the through bore X changes. As a result, the sensor detects entry of the picklock instrument. The turn-on signal of the sensor 6 is input through the I/O interface 8 to the CPU 9.

The thief may try to undo the lock mechanism 40 by inserting the thin plate 59 through the space between the window pane 43 and the door panel 42a. With insertion of the thin plate 59, the light of the band sensor 600 is interrupted and the turn-on signal is output. The turn-on signal of the band sensor 600 is input through the I/O interface 8 to the CPU 9.

In this state the CPU 9 outputs the alarm signal to the alarm 14 in response to the signal from the receiver 11 and the signal from the sensor 6 or the band sensor 600. Thus an alarm buzzer is given before the thief opens the door by means of a picklock instrument, whereby the car is safeguarded against theft. The period for alarm sounding may be allowed to continue until the CPU (control unit) 9 is turned off.

On the other hand, when the car owner or authorized person intends to open the car door with the door key, he or she cancels the alarm drive signal by means of the remote control transmitter 10, for example. Then the alarm will not sound with insertion into the door lock 100 of the door key since the signal is not input from the receiver 11 though the sensor 6 gives the turn-on signal.

As does the CPU 9, the OR circuit 70 and AND circuit 71 in the embodiment of FIG. 9, and the series circuit 81–83 in the embodiment of FIG. 10 confirm input of the signals from the receiver 11 and from the sensor 6 or band sensor 600, and output the alarm signal to the alarm 14.

Thus, according to the present invention, before the car door is opened by a thief, the sensor 6 detects entry of the door key 200 or other article and sounds the alarm. The car owner or authorized person is able to insert the door key through the keyhole 3 and undo the door lock without sounding the alarm by turning off the alarm drive device and/or the sensor beforehand.

Figure 11:
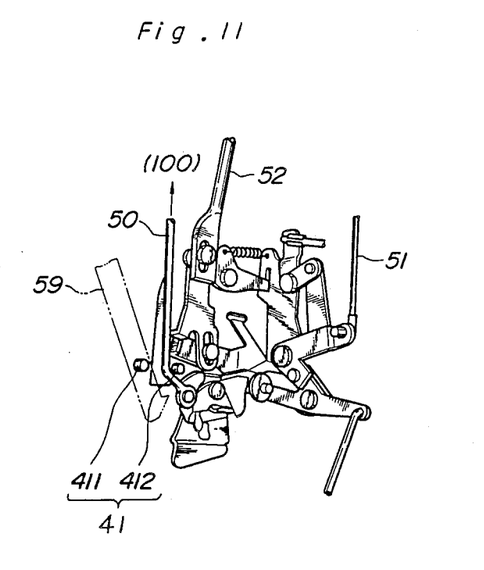
FIG. 11 is a perspective view of a door lock mechanism.

FIG. 11 is a detailed perspective view of the door lock mechanism 40 which, in this embodiment, includes a sensor 41 according to the present invention.

The sensor 41 is mounted as part of the door lock mechanism 40 or at an appropriate position in a space between the door lock mechanism 40 and the window pane. More specifically, the appropriate position is a position of passage, and an area surrounding such a position, of the thin plate 59 or the like used by a thief for manipulating the door lock mechanism 40 in an attempt to unlock the door. In the illustrated example, the sensor 41 includes a light emitting diode 411 and a phototransistor 412 disposed adjacent a lower end of a link 50 connected to the cylinder door lock 100.

In FIG. 11, number 51 indicates a link connected to the side door knob 44, and number 52 indicates a link connected to the outside door knob 45.

It will be clear from the foregoing description that the following points should be noted in understanding the scope of the present invention:

The sensor is not limited to any particular type as long as it can be mounted in or adjacent the cylinder lock or the door lock mechanism and can detect the door key or other article inserted into or adjacent the cylinder lock, or a plate, bar or other instrument inserted into the door lock mechanism. Such a sensor may comprise a photosensor including a light emitting element and a light receiving element, or a limit switch or proximity switch operable upon contact with the door key or other articles.

The alarm device is not limited to a particular type as long as it is operable by an alarm signal provided by the control unit in response to the output signals from the sensor and the alarm drive device. The alarm may comprise, for example, a buzzer for producing an extraordinary warning sound, a car horn, a signal lamp for emitting red light, or their combination.

The alarm drive device is not limited to a particular type as long as it transmits a signal for driving the alarm. The alarm drive device may comprise, for example, a combination of a remote control transmitter and a receiver, a combination of a light emitting element and a light receiving element, or a device directly plugged into a connector provided on a car body to transmit a signal for driving the alarm.

The control unit is not limited to a particular construction as long as it outputs an alarm signal to the alarm device in response to the output signals from the sensor and the alarm drive device occurring when a person other than the car owner or authorized person (namely a thief) inserts a door key or other article into the cylinder lock of the door. Specifically, the control unit may comprise the CPU of a computer, that is a CPU storing a program for outputting an alarm signal to the alarm device upon receipt of the output signals from the alarm drive device and the sensor, a device including an AND circuit and the like of logic elements for outputting an alarm signal to the alarm device in response to the output signals from the alarm drive device and the sensor, or a device including a series circuit of a first switch connected to the sensor and a second switch connected to the receiver for outputting an alarm signal to the alarm device in response to the output signals from the sensor and the receiver.

Further the sensor is not limited to any particular type as long as it can be mounted adjacent the cylinder look and can detect the door key or other article inserted into the cylinder lock. Such a sensor may comprise a photosensor including a light emitting element and a light receiving element, a combination of an ultrasonic or radio wave transmitter and an associated receiver, or a combination of an ultrasonic or radio wave transmitter and a sensing element for detecting disturbances of the ultrasonic or radio waves.

The band sensor used in this invention is not limited to a particular type as long as it can be mounted in the space between the window pane and the door panel and can detect a thin plate, bar or other article inserted through that space. Such a band sensor may comprise an image sensor or a line sensor. The line sensor is preferred since it is inexpensive and can be mounted in a narrow space. The line sensor may comprise a CTD such as a CCD or a BBD.

Further, the band sensor may comprise a photosensor including a light emitting element and a light receiving element, an ultrasonic or radio wave emitter-receiver combination, a combination of a light, ultrasonic or radio wave emitter and a sensing element for detecting disturbances of the light, ultrasonic or radio waves, or a pressure sensitive element in band form.

In other words, the band sensor employed in the present invention may comprise a sensor including a ceramic oscillator utilizing ultrasonic wave or a composite oscillator, a proximity sensor utilizing magnetism, a pressure sensitive switch, or a radio wave sensor. These sensors and switches may be the transmission type or the reflection type, and may be formed of a single element or a plurality of elements arranged at selected intervals.

What is claimed is:

1. A car theft proofing system comprising a cylinder door lock including an outer cylinder (1), an inner cylinder (2) rotatable within said outer cylinder, a first radial bore in said outer cylinder that passes through said outer cylinder, a second bore in said inner cylinder that passes through said inner cylinder, said second bore in said inner cylinder being movable to axially align with said first bore in said outer cylinder, a sensor attached to said cylinder door lock in alignment with said first bore for detecting insertion into said door lock of a door key as well as any other article, an alarm device for giving an alarm, an alarm drive means in alignment with said sensor for producing an output signal for driving said alarm device, and control means to cause alarm device to give an alarm in response to an input signal received by said alarm drive means from said sensor and an output signal from said alarm drive means to said alarm device.

2. A car theft proofing system as set forth in claim 1 in which said sensor is mounted within said first bore of said outer cylinder of said cylinder door lock for detecting insertion into the door lock of a door key or other article, an alarm device for giving an alarm, alarm drive means to output a signal for driving the alarm device, and control means to cause the alarm device to give the alarm in response to a signal received from the sensor and the signal from the alarm drive means.

3. A car theft proofing system as claimed in claim 2, wherein said sensor is disposed outwardly of said bore, said sensor includes an output element for providing an output signal and said alarm drive means is positioned to detect said output signal as reflected by a door key as well as any other article inserted into said door lock.

4. A car theft proofing system as claimed in claim 3, wherein said alarm drive means detects disturbances of said output signal as reflected back to said alarm drive means.

5. A car theft proofing system for sounding an alarm provided someone tries to gain illegal entry of a vehicle comprising a door lock mechanism within said door, a first sensor attached within a confined area of said door above said door lock mechanism for detecting insertion into said of a plate, a bar as well as any other article along said first sensor toward said door lock mechanism, a cylinder door lock including an outer cylinder (1), an inner cylinder (2) rotatable within said outer cylinder, a first bore in said outer cylinder that passes radially through said outer cylinder, a second bore in said inner cylinder that passes radially through said inner cylinder, said second bore in said inner cylinder being movable to axially align with said first bore in said outer cylinder, a second sensor attached to said first cylinder of said cylinder door lock for detecting insertion into said cylinder door lock of a door key as well as any other article, an alarm device for giving an alarm, alarm drive means adapted to receive a signal from said first and second sensors to produce an output signal for driving said alarm device, and control means to cause said alarm device to give an alarm in response to an input signal received from at least one of said first and second sensors by said alarm drive device and an output signal from said alarm drive means received by said alarm device.

6. A car theft proofing system for sounding an alarm provided someone tries to gain illegal entry of a vehicle comprising a door lock mechanism, a band sensor mounted in a space between a car door and a window pane and upwardly of said door lock mechanism for detecting insertion of a plate, a bar as well as any other article into said space, a cylinder door lock including an outer cylinder (1), an inner cylinder (2) rotatable within said outer cylinder, a first bore in said outer cylinder that passes through said outer cylinder, a second bore in said inner cylinder that passes through said inner cylinder, said second bore in said inner cylinder being movable to axially align with said first bore in said outer cylinder, a door lock sensor mounted relative to said bore in said first cylinder of said cylinder door lock for detecting insertion into said cylinder door lock of a door key as well as any other article, an alarm device for giving an alarm, alarm drive means for directing an output signal for driving said alarm device to give said alarm in response to an input signal from at least one of said band sensor and said door lock sensor received by said alarm drive means and an output signal from said drive means directed to said alarm device.

7. A car theft proofing system as claimed in claim 6, wherein said bore in said outer cylinder of said cylinder door lock extends from one peripheral position of said outer cylinder to an opposite peripheral position in alignment with said second bore and a keyhole in said inner cylinder, said door lock sensor including an output element disposed outwardly of said one peripheral position of said outer cylinder for providing an output signal and said alarm drive means is disposed outwardly of said opposite peripheral position of said outer cylinder for detecting an input signal from said sensor and directing an output signal to said alarm device.

* * * * *